March 30, 1965
J. D. BANYAS
3,175,702
ARTICLE TRANSFER APPARATUS
Filed Jan. 4, 1962
6 Sheets-Sheet 1
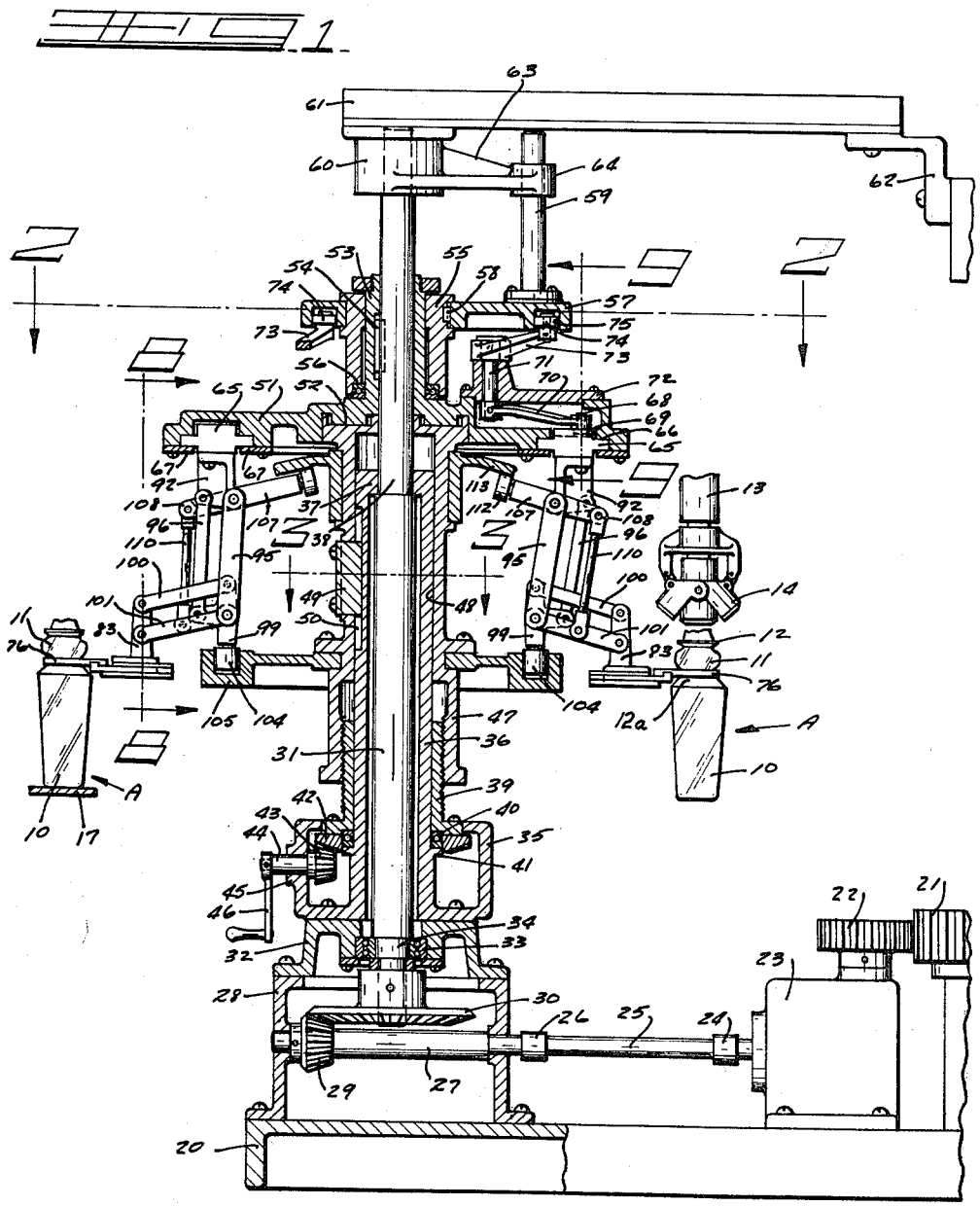
INVENTOR.
JOHN D. BANYAS
BY J.F. TEIGLAND &
W.A. SCHAICH
ATTORNEYS March 30, 1965  J. D. BANYAS  3,175,702
ARTICLE TRANSFER APPARATUS
Filed Jan. 4, 1962  6 Sheets-Sheet 2
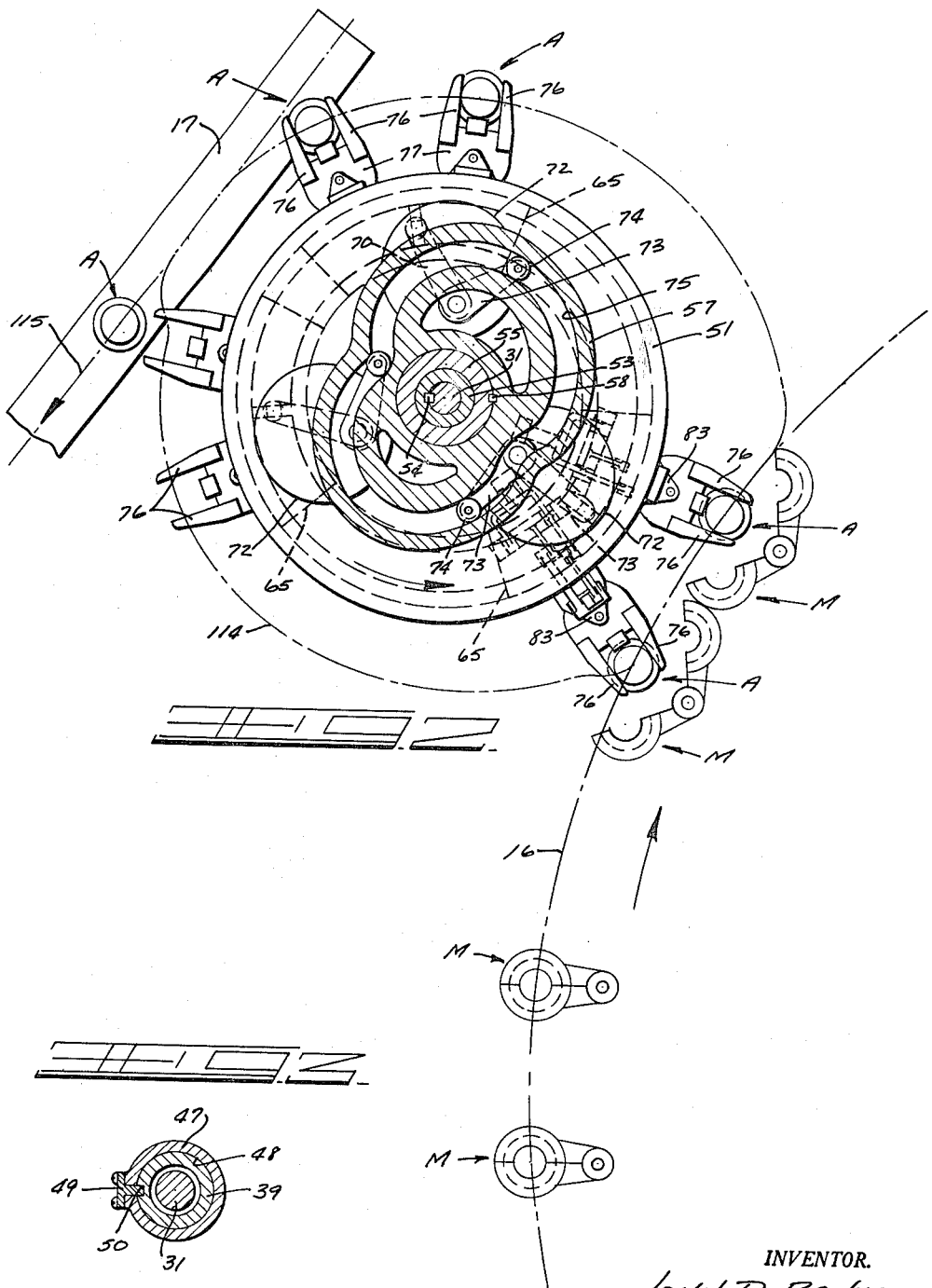
INVENTOR.
JOHN D. BANYAS
BY J. F. TEIGLAND &
W. A. SCHAICH
ATTORNEYS March 30, 1965  J. D. BANYAS  3,175,702
ARTICLE TRANSFER APPARATUS
Filed Jan. 4, 1962  6 Sheets-Sheet 3

INVENTOR.
JOHN D. BANYAS
BY J. F. TEIGLAND &
W. A. SCHAICH
ATTORNEYS

March 30, 1965  J. D. BANYAS  3,175,702
ARTICLE TRANSFER APPARATUS
Filed Jan. 4, 1962  6 Sheets-Sheet 4
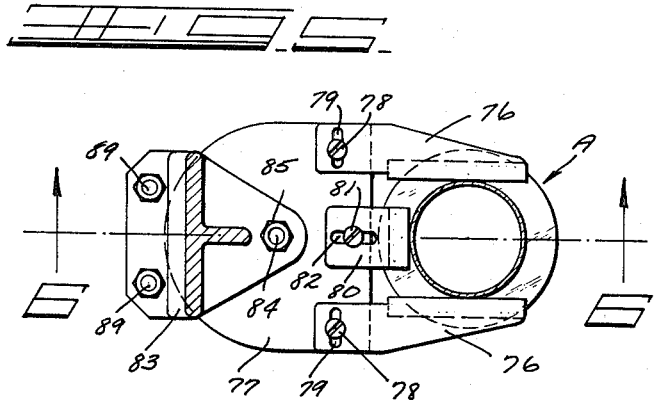
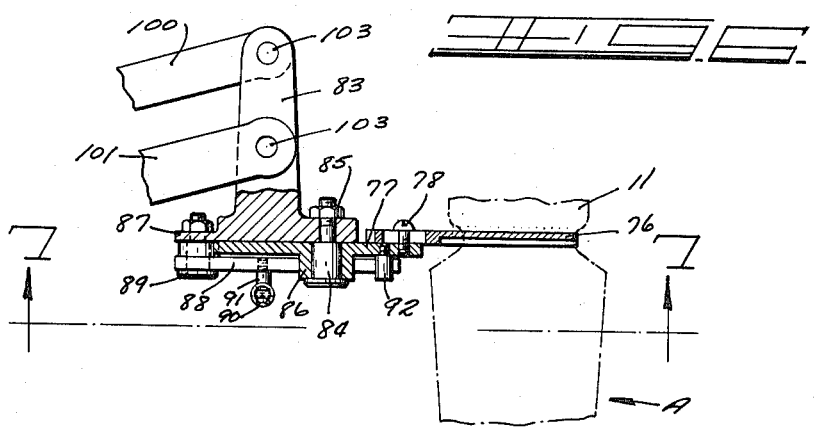
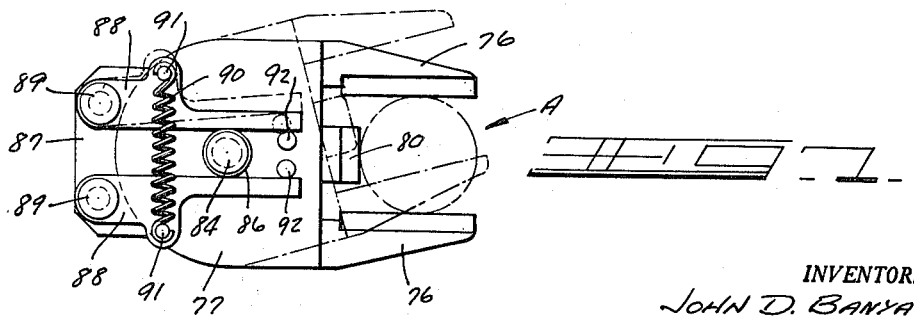
INVENTOR.
JOHN D. BANYAS
BY J. F. TEIGLAND &
W. A. SCHAICH
ATTORNEYS

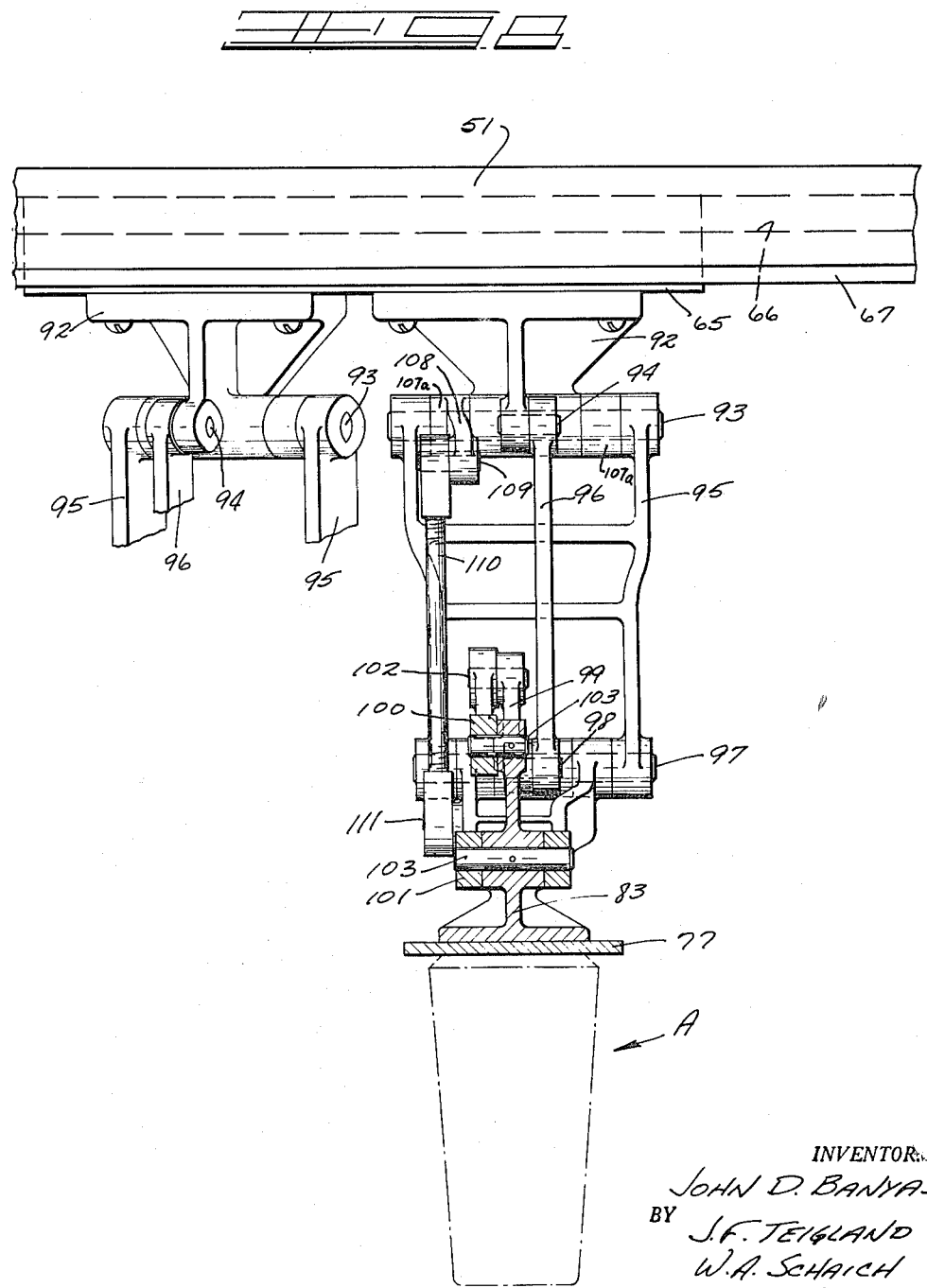

March 30, 1965 J. D. BANYAS 3,175,702
ARTICLE TRANSFER APPARATUS
Filed Jan. 4, 1962 6 Sheets-Sheet 6
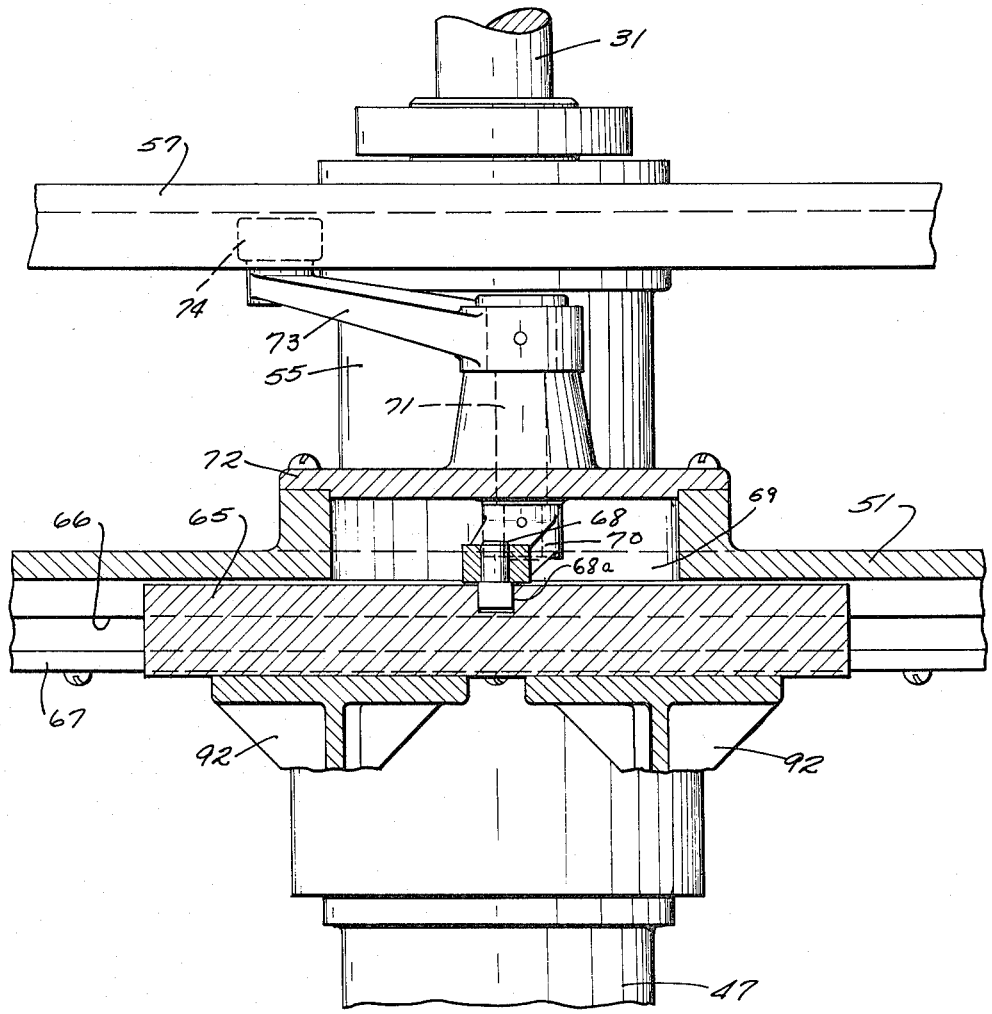
INVENTOR.
JOHN D. BANYAS
BY
J. F. TEIGLAND &
W. A. SCHAICH
ATTORNEYS United States Patent Office 3,175,702
Patented Mar. 30, 1965

3,175,702
ARTICLE TRANSFER APPARATUS
John D. Banyas, Toledo, Ohio, assignor to Owens-Illinois Glass Company, a corporation of Ohio
Filed Jan. 4, 1962, Ser. No. 164,313
10 Claims. (Cl. 214—1)

This invention relates generally to article transfer apparatus, and more particularly to article transfer apparatus for receiving articles from a continuously moving article support and transferring them to another continuously moving article support.

The apparatus of this invention has special application in the glass forming industry for unloading glassware from the well-known Westlake glassware forming machine, described in U.S. Patent No. 1,527,556. The Westlake machine typically has twelve pairs of spindles, each spindle being in effect a blowpipe on which a charge of glass is blown to form a hollow glass article. The spindles are grouped in pairs, with the spacing between spindles in a pair not being equal to adjacent spindles in different pairs. The hollow article is generally a tumbler having a top portion of waste glass, called the moil, by which it is held. Presently the glassware is manually removed from the Westlake machine and placed in a conventional burnoff machine, where the tumbler is held in a chuck and the moil severed from the tumbler. The burnoff chucks are equally spaced apart.

This invention, while it has general utility as transfer apparatus, is directed primarily to the provision of transfer apparatus for automatically transferring glassware from a Westlake machine, wherein the spacing between successive articles is not uniform, to a straight line conveyor, with the articles uniformly spaced thereon.

The apparatus of this invention comprises a plurality of article holders that are mounted for rotational movement about a fixed center. The mounting means are cam operated to move the article holders radially in and out, and vertically up and down. A cam is also provided to vary the angular velocity of the article holders. The supporting means for the article holders allow positive three-dimensional control over the path of the article holders whereby changes in the controlling cams permit the path of the article holders to coincide with the paths of the article supports, before and after transfer, to permit smooth loading and unloading of the transfer apparatus.

Accordingly, it is an object of this invention to provide improved article transfer apparatus wherein positive three-dimensional control is exercised over the path of the article holder.

Another object of this invention is to provide improved article transfer apparatus having an article holder moving about a fixed center, wherein the angular velocity of the holder may be positively varied.

A further object of this invention is to provide improved article transfer apparatus having an article holder moving about a fixed center, wherein the path of the article holder can be varied to coincide with the paths of the article prior to and after transfer.

The specific nature of this invention, as well as other objects and advantages thereof, will become apparent to those skilled in the art from the following detailed description, taken in conjunction with the annexed sheets of drawings on which, by way of example only, the preferred embodiment of this invention is illustrated.

In the drawings:

FIG. 1 is a front elevational view, partly in section, of the apparatus of this invention;

FIG. 2 is a sectional view taken along the line 2—2 of FIG. 1, showing the top cam and the path taken by the articles during transfer;

FIG. 3 is a sectional view along the line 3—3 of FIG. 1;

FIG. 5 is a sectional view taken along the line 5—5 of FIG. 4, showing the article holder;

FIG. 6 is a sectional view taken along the line 6—6 of FIG. 5;

FIG. 7 is a view taken along the line 7—7 of FIG. 6, showing the bottom of the article holder;

FIG. 8 is a side elevational view, partly in section, showing the supporting linkage for the article holder; and FIG. 9 is a sectional view taken along the line 9—9 of FIG. 1.

General description

Figure 4:
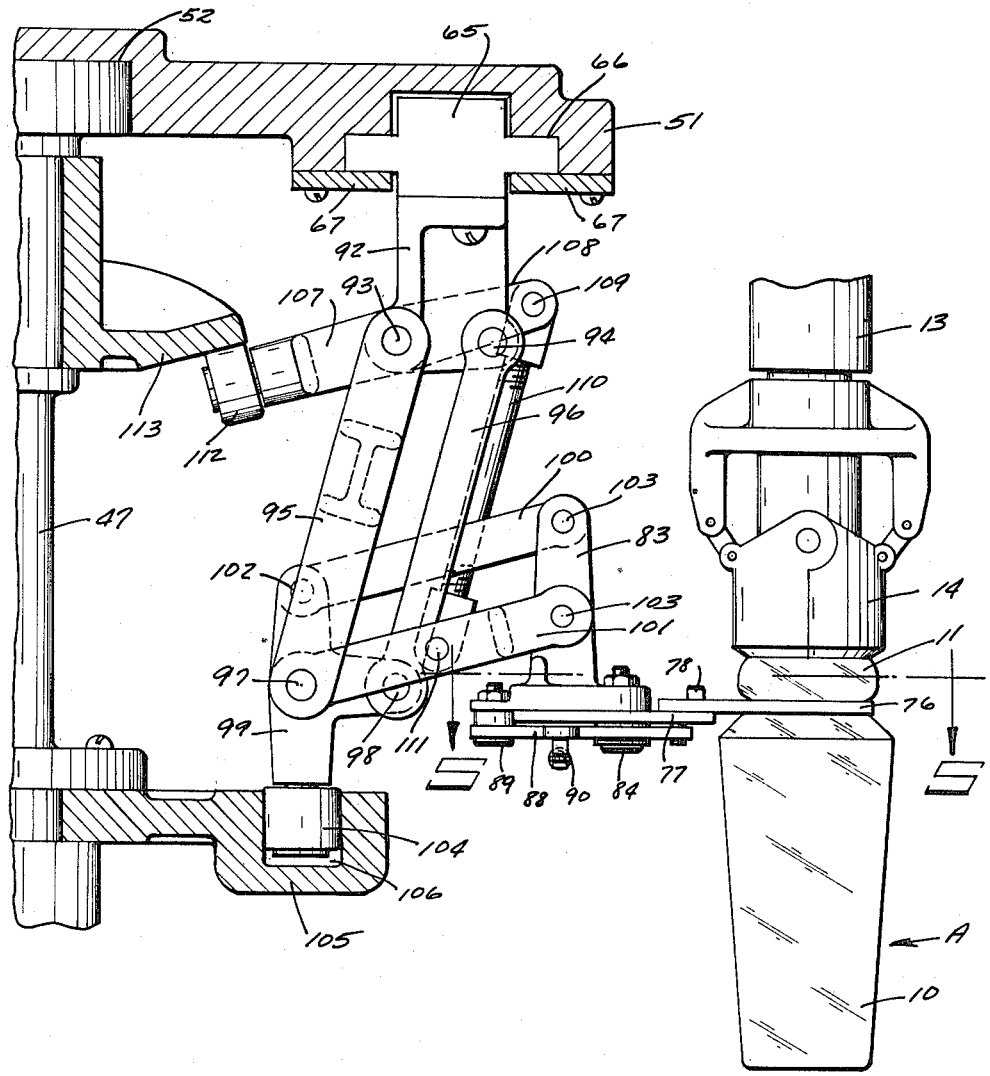
FIG. 4 is an enlarged elevational view, partly in section, showing the article holder at the moment it is to receive a workpiece.

In its preferred embodiment, the apparatus of this invention is designed to transfer a workpiece, such as a hollow blown glass article A having a lower or tumbler portion 10 and an upper portion of waste glass called moil 11. The moil 11 has an upper flanged portion 12, by which it is held against a spindle 13 by a pair of jaws 14, and also a constricted or necked-in portion 12a. The spindles 13 are arranged in pairs on a conventional Westlake forming machine. See U.S. Patent No. 1,527,556. The spacing between adjacent spindles not in a pair is not the same as the spacing between spindles in a pair. The spacing between spindles in a pair and between pairs of spindles is the same.

Referring to FIG. 2, the glassware is carried along a circular path 16 by the glass forming machine at a uniform angular velocity. Pairs of molds M in open and closed positions are shown to indicate the spacing of the spindles 13. Basically, the articles A are caught by the article holders of the apparatus at the moment they are released by the jaws 14. The articles are then carried to a straight line conveyor 17 on which they are deposited with uniform spacing between successive articles.

Power transmission

Referring to FIG. 1, the apparatus of this invention is mounted on a base 20. Partially shown on FIG. 1 is a gear wheel 21 which is the main gear on Westlake machine and controls the angular velocity of the spindles 13. A spur gear 22 runs in mesh with the main gear 21 and is secured to the input shaft of a speed reducer 23 that is mounted on the base 20. The output shaft of the speed reducer 23 is secured by a coupling 24 to a drive shaft 25. The opposite end of the drive shaft 25 is secured by a coupling 26 to a gear shaft 27. The gear shaft 27 is journaled for free rotational movement in a gear housing 28 that is mounted on the base 20. The gear shaft 27 has pinned thereto, at one end, a bevel gear 29 that is at right angles to and runs in mesh with a second bevel gear 30. The second bevel gear 30 is pinned to the lower end of a main shaft 31, which is journaled at its upper and lower ends and at an intermediate portion for free rotational movement, in a manner to be described. From the foregoing description, it may be seen that the rotational speeds of the main shaft 31 and the spindles 13 are directly proportional.

Supporting structure

Referring to FIG. 1, a bearing housing 32 is mounted on the bevel gear housing 28. The bearing housing has mounted therein a conventional thrust bearing 33 that rotatably mounts the lower end 34 of the main shaft 31. An elevating housing 35 is mounted on the bearing housing 32. The elevating housing has an inner, upstanding, cylindrical portion 36 that is concentric with the main shaft 31. The upper end of the cylindrical portion 36 has a radially inwardly extending shoulder 37 that serves as a bearing surface and journals the intermediate portion 38 of the main shaft 31.

An elevating screw 39 encircles the cylindrical portion 36 and is rotatably mounted at its lower end on an end bearing 40. The end bearing 40 is seated on an annular shoulder 41 formed on the cylindrical portion. A ring type bevel gear 42 is secured to the lower end of the elevating screw 39. The ring type bevel gear 42 runs in mesh with a second bevel gear 43. The second bevel gear 43 is pinned to a shaft 44 that is journaled in the sidewall 45 of the elevating housing 35. A hand crank 46 is secured to the outer end of the shaft 44. Rotation of the hand crank 46 will rotate the elevating screw 39.

A cam shell 47 is threadedly mounted on the elevating screw 39. The cam shell 47 extends upwardly from the elevating screws and is centered, relative to the main shaft 31, by the cylindrical portion 36 of the elevating housing. The cam shell has a cylindrical bearing surface 48 that is in sliding contact with the cylindrical portion 36. A T-shaped key 49 that extends through and is secured to the sidewall of the cam shell 47, and extends into a longitudinally extending slot 50 formed on the cylindrical portion, is used to prevent the cam shell from rotating relative to the cylindrical portion (see FIG. 3). As can be seen from the foregoing description, rotation of the hand crank 46 will cause the elevating screw 39 to rotate, thereby moving the cam shell 47 up and down. The purpose of this is to vary the vertical height, as may be required by a particular application, of the article carriers and their support structure, which will be described in detail hereinafter.

A sector housing or turret 51 is mounted atop the upper end of the cam shell 47 for rotational movement relative to the cam shell. The sector housing 51 has an annular bearing surface 52 that bears against the upper end of the cam shell 47. The sector housing has an annular, upstanding portion 53 that encircles and has a slip fit with the main shaft 31 to thereby keep the sector housing concentric with the main shaft. The sector housing or turret 51 is secured to the main shaft 31 by a key 54, whereby it will rotate with the main shaft.

A stationary cam carrier 55 encircles and is mounted concentric with the annular, upstanding portion 53 of the sector housing 51. The cam carrier 55 is seated on an end bearing 56 that is mounted on the sector housing. The end bearing 56 allows the upstanding portion 53 to rotate freely while outer cam carrier 55 remains stationary. A face cam 57 encircles and is mounted on the cam carrier 55. A key 58 prevents rotational movement between the cam carrier 55 and the face cam 57. An upstanding guide pin 59 is secured to the upper surface of the face cam 57.

The upper end of the main shaft 31 is journaled in a bearing bracket 60 that is secured to an angle support 61. The angle support 61 is secured at its outer end to a stationary flange 62. The angle support 61 and bearing bracket serve to rigidly locate the upper end of the main shaft. A web 63 extends outwardly from the bearing bracket 60 and supports an annular hub 64 which is stationary. The hub 64 locates the upper end of the guide pin 59, thereby preventing the cam carrier 55 and the face cam 57 from rotating.

Referring to FIGS. 2, 4, and 9, three sector plates 65 are slidably mounted in an annular, T-shaped groove 66 formed in the sector housing or turret 51. The annular groove 66 has for its geometrical center the axis of rotation of the turret. The sector plates 65 are held in the annular groove 66 by retaining plates 67 which are secured to the sector housing 51. Each sector plate 65, which is arcuate and extends through an arc of approximately 60°, serves to support and carry a pair of article carriers (not yet described).

A pivot pin 68 is contained in a radial slot 68a in each sector plate 65 and extends above the sector plate through an elongated opening 69 provided in the sector housing 51 (see FIG. 4). An oscillator arm 70 has one end pivotally connected to the pivot pin 68 and the other end securely pinned to an oscillator shaft 71. The oscillator shaft 71 is journaled for rotational movement in an oscillator shaft housing 72 mounted on the sector housing 51. A cam arm 73 is securely pinned to the upper end of the oscillator shaft and has rotatably mounted at its outer end a cam follower 74. The cam arm 73, oscillator arm 70, and shaft 71 form, in effect, a bell crank lever. The cam follower rides in the cam groove 75 of the face cam 57 (see FIG. 2). When the sector housing 51 is rotated by the main shaft 31, the oscillator shaft housing 72 will also rotate, thereby carrying with it the sector plate 65. As the oscillator arm 70 pivots under the action of the cam follower 74 riding in the cam groove 75, the relative angular position of the sector plate with respect to the sector housing will vary, thereby varying the angular velocity of the sector plate. For example, as the cam follower 74 is moved radially outwardly, the oscillator arm will move the sector plate forward, giving it a temporary angular velocity greater than the sector housing. When the cam follower is moved radially inwardly, the sector plate 65 will move backwardly with respect to the sector housing, thereby giving sector plate a temporary angular velocity less than that of the sector housing.

*Article carrier*

Referring to FIGS. 4–7, the article carrier used with the preferred embodiment of this invention is designed to catch the workpiece, i.e., a hollow glass article having a constricted portion, at the constricted portion between a pair of fixed fingers, as it (the workpiece) is released by the glass forming machine.

Referring now to FIGS. 5 to 7, a pair of fingers 76 are secured, parallel to each other, to a finger holder 77 by screws 78. The screws 78 extend through slots 79 formed in the fingers, thereby permitting lateral adjustment of the fingers 76. The pair of fingers are spaced apart a distance slightly greater than the diameter of constricted portion 12a of the article A. A middle finger 80, which serves as a backstop, is adjustably secured to the finger holder 77 by a screw 81 extending through a slot 82. The fingers 76 and the middle finger 80 are provided with undercuts in the area adjacent to their respective glass contacting edges to allow easier engagement with the article A. The glass contacting surfaces of the fingers can be covered with a conventional heat resistant, insulative coating if desired.

The finger holder 77 with the fingers attached thereto is pivotally mounted on a finger bracket 83, and self-centering means are provided to resiliently center the finger holder 77 relative to the finger bracket 83. Referring to FIGS. 5 to 7, the finger holder 77 is pivotally mounted on a pivot pin 84 that is secured to the finger bracket 83 by a nut 85. The finger holder 77 has an annular boss 86 that encircles the pivot pin 84. A flange 87 protrudes from the rear of the finger bracket. A pair of centering fingers 88 are pivotally mounted in parallel, spaced apart relation on the flange 87 by pivot pins 89. The centering fingers 88 are urged together by means of tension spring 90, which is mounted on studs 91 secured to the centering fingers. The spring 90 causes the centering fingers to bear against the annular boss 86 of the finger holder 77. At their outer ends the centering fingers 88 bear against a pair of studs 92 mounted on the finger holder 77. From the foregoing description it may be seen that as the finger holder 77 pivots off-center it works against the spring 90 which tends to recenter it. This feature compensates for a misalignment between the fingers and the ware. This feature also allows the finger holder to swing in the event that the fingers 76 hit an obstruction.

*Linkage for the article carriers*

As mentioned before, each of the sector plates 65 carries and supports a pair of article carriers. Referring to FIGS. 4 and 8, a pair of linkage support brackets 92 are secured in spaced apart, depending relation to each of the sector plates 65. At the lower end of the linkage support bracket are a pair of bosses that carry hinge pins 93 and 94. A pair of connecting links 95 and 96 are pivotally mounted on the hinge pins 93 and 94, respectively. The first mentioned connecting link 95 resembles a yoke and comprises two side rails held together by a central web portion. The connecting links 95 and 96 are of equal length. The connecting links 95 and 96 are pivotally mounted at their lower ends on hinge pins 97 and 98 that are carried by a T-shaped cam link 99. The spacing between the hinge pins 93 and 94 and hinge pins 97 and 98 is the same, so that the connecting links 95 and 96 are parallel. A second set of connecting links 100 and 101 are pivotally mounted on the cam link by hinge pins 102 and 97, respectively. The connecting links 100 and 101 are also of equal length and are pivotally mounted in parallel relation by hinge pins 103 to an upstanding web formed on the finger bracket 83. A cam follower 104 is rotatably mounted on the lower end of the cam link 99. A face cam 105 is securely mounted on the cam shell 47. The face cam 105 has a cam track 106 which is arranged to confine and move the cam follower 104 radially in and out. From the foregoing description it will be evident that the cam follower 104 moves radially in and out the finger bracket 83, and hence the finger 76 will move radially in and out in a horizontal plane. The vertical height of the aforementioned horizontal plane will vary but this is compensated for in a manner to be described.

An inside yoke 107 is pivotally mounted on the hinge pin 93 carried by the linkage support bracket 92. The inside yoke 107 has a U-shaped portion, providing a pair of arms 107a, that are mounted inside the outside yoke or connecting link 95. One of the arms 107a of the inside yoke 107 has an outwardly extending arm 108 that carries a wrist pin 109. A longitudinally adjustable connecting rod 110 is pivotally mounted, at its upper end, on the wrist pin 109, and, at its lower end, on a wrist pin 111 carried by the connecting link 101. A cam follower 112 is rotatably mounted at the inner end of the inside yoke 107. The cam follower 112 rides against a cam 113 that is secured to the cam shell 47. From the foregoing description, it may be seen that as the cam follower 112 is moved vertically up and down by the cam 113, the inside yoke 107 will pivot, thereby carrying the connecting rod 110 up and down. The connecting rod will move the connecting link 101 in a like manner, thereby varying the vertical height of the horizontal plane of the article carrier.

*Cam operation*

The radial displacement of the article carrier and the vertical height of the article carrier, are controlled by the face cam 105 and the cam 113, respectively. The operation of these two cams is correlated since each has an effect on the other. For example, radial displacement by the face cam 105 will also, to a slight degree, vary the vertical height of the article carrier. This is compensated for by the cam 113. The configuration of a particular cam, for a given application, can be calculated in a conventional manner. The radial displacement or horizontal path of the article carrier in the preferred embodiment of this invention is shown by the center line 114 in FIG. 2. It is to be noted that the center line 114 of the article carrier is made to coincide with the horizontal path 16 of the article A when it is carried by the glass forming machine, and with the center line 115 of the conveyor 17 when the article is released. The vertical height of the article carrier is adjusted so that the fingers 76 are in the same plane as the constricted portion 12a of the moil 11 when the article is picked up, and so that the bottom of the article rests on the conveyor when the article is released.

The top face cam 57 is designed so that the relative angular velocity between the article carrier and article during pick-up is approximately zero, thereby allowing the fingers to "walk in," like a pair of meshing gear teeth, to support and carry the article as it is released. The face cam 57 is also designed so that the relative velocity between the article and conveyor is approximately zero during release, thereby allowing the article to be set down on the conveyor and the fingers 76 to "walk away" from it. In the preferred operation of the apparatus, the velocity of the spindle 13, the conveyor 17 and the forward carrier of a pair of article carriers is the same, thereby eliminating the need for radial displacement of the follower cam 74 when the forward article carrier is picking up or releasing an article. Under the foregoing conditions, the sector plate can be split into two parts, with the forward portion that is carrying the forward article carrier being secured to the sector housing 51 for positive rotation therewith. For the embodiment described herein, the rear carrier of a pair of aritcle carriers is caused, by the configuration of the cam groove 75 of the face cam 57, to speed up just prior to the time it picks up an article, and is then caused to lag behind the forward carrier as the article is set down on the conveyor to get the desired equal spacing between articles on a conveyor.

If it is desirable to have an adjacent pair of article carriers move simultaneously up or down, the yoke 107 of one of the article carriers can be extended to place its cam follower 112 at a different point on the cam 113. The cam 113 can then be arranged to provide two different cam surfaces, each giving a different vertical height.

It is to be understood that the preferred embodiment of my invention, and its application in one particular industry, has been described herein. By varying the cam configurations, as described herein, and substituting suitable, conventional article holders, the apparatus of my invention can be utilized in additional transfer application where positive three-dimension control over the article holders is desired.

It will, of course, be understood that various details of construction may be modified through a wide range without departing from the principles of this invention, and it is not, therefore, the purpose to limit the patent granted hereon otherwise than necessitated by the scope of the appended claims.

I claim:
1. Transfer apparatus for transferring a continuously moving article from a first predetermined path to a second predetermined path, comprising:
  (1) an article carrier support;
  (2) rotating means for rotating said support about a central, vertical axis;
  (3) article carrier means for receiving and supporting said article during transfer;
  (4) two sets of four-bar linkage supportingly connecting said carrier means to said support, said links operatively connected through a common pivot point and arranged to permit said carrier means to move radially and vertically;
  (5) path-determining means responsive to the angular displacement of said carrier support for displacing said four-bar linkage to cause the path of said carrier means to coincide with said first and second predetermined paths.

2. Transfer apparatus according to claim 1, plus displacement means for angularly displacing said carrier support to vary its velocity to cause the velocity of the carrier means to coincide with the velocity of said article just prior to and just after the article has been transferred.

3. Transfer apparatus according to claim 2, wherein said displacement means comprises:
  (1) means for slidably mounting said carrier support; and,
  (2) a pivotally mounted bell crank lever, operatively connected at one end to said carrier support, and having its other end in operative engagement with a stationary cam surface.

4. Transfer apparatus, according to claim 1, wherein said rotating means includes a rotatably mounted turret.

5. Transfer apparatus as defined in claim 1, wherein said article carrier means includes a pair of parallel fingers, mounted in spaced-apart relation.

6. Transfer apparatus according to claim 1, wherein said path-determining means includes a cam follower operatively connected to displace one set of four-bar linkage and a stationary cam, said follower arranged to be responsive to said cam to displace one set of four-bar linkage.

7. Transfer apparatus as defined in claim 1, wherein opposed bars of said four-bar linkage are of equal length.

8. Transfer apparatus as defined in claim 1, wherein said path determining means includes first and second stationary cams, first means responsive to said first cam for displacing one set of said four-bar linkage and second means responsive to said second cam for displacing the other of said pair of four-bar linkages.

9. Apparatus for transferring an article from one continuously moving carrier to a second continuously moving carrier comprising:
 (1) an article carrier,
 (2) a rotating turret,
 (3) a sector plate slidably mounted in said turret for relative sliding motion with respect to said turret about the axis thereof,
 (4) means connected to said sector plate for sliding said sector plate relative to said turret, said means being responsive to the angular displacement of said turret,
 (5) two sets of four-bar linkage supportingly connecting said carrier to said sector plate, operatively connected through a common pivot point and arranged to permit said article carrier to move radially and vertically, and
 (6) means responsive to the angular displacement of said turret for displacing said four-bar linkages to cause the path of said carrier means to coincide with the path and movement of said one continuously moving carrier and said second continuously moving carrier.

10. Apparatus as defined in claim 9, wherein said article carrier comprises:
 (1) a pair of spaced apart, parallel fingers arranged to receive and support said articles,
 (2) said fingers being secured to a holder,
 (3) said holder being pivotally connected to the lower end of one arm of said four-bar linkage, and
 (4) means for resiliently centering said holder along a predetermined centerline relative to said one arm of said four-bar linkage.

References Cited by the Examiner
UNITED STATES PATENTS

| | | | |
|---|---|---|---|
| 1,461,222 | 7/23 | Myers | 198—209 |
| 1,940,634 | 12/33 | Soubier. | |
| 2,858,865 | 11/58 | Fleming | 198—210 |
| 2,888,131 | 5/59 | Allen | 198—210 |

SAMUEL F. COLEMAN, *Acting Primary Examiner.*

WILLIAM B. LA BORDE, ERNEST A. FALLER, JR.,
*Examiners.*